Patented Feb. 16, 1937

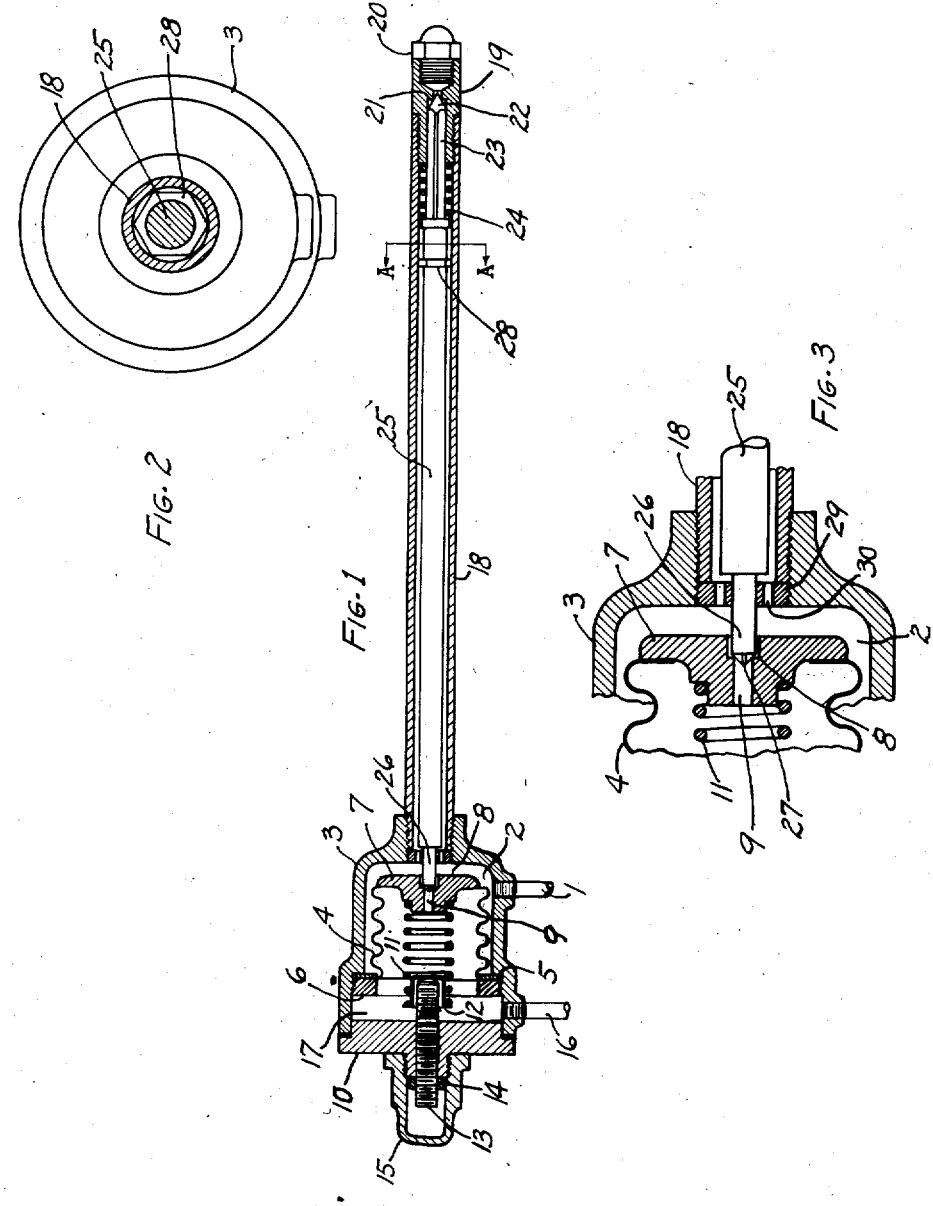

2,071,143

UNITED STATES PATENT OFFICE 2,071,143

AUTOMATIC VALVE

Lewis L. Scott, Kirkwood, Mo., assignor to Detroit Lubricator Company, Detroit, Mich., a corporation of Michigan Application March 21, 1930, Serial No. 437,783

15 Claims. (Cl. 137—153)

This invention relates to automatic valves for controlling the flow and pressure of liquids, such as oil and the like.

The object of my invention is to provide a simple and effective automatic valve and one that can be produced at low cost.

My present invention is an improvement over the valve construction shown in my Patent No. 1,640,729, dated August 30th, 1927 and a continuation in part of my application Serial No. 401,709, filed October 23, 1929, for improvement in Oil burning system.

In the accompanying drawing:—

Figure 1 is a sectional view of my automatic valve.

Figure 2 is an enlarged end view, shown partly in section on the line AA, of Figure 1.

Figure 3 is an enlarged sectional view of the by-pass valve, shown in Figure 1.

Referring now to the drawing, the numeral 1 indicates an oil intake pipe from the pressure side of a pump, not shown, which pipe is connected to the interior chamber 2 of the casting 3. The numeral 4 indicates a flexible bellows, one end of which is seated against the shoulder 5 of the casting 3, which end is locked in position against the shoulder 5 by the nut 6. The other end of the flexible bellows 4 is secured to the member 7, which member is formed with a valve seat 8 and a fuel return passage 9. The numeral 10 indicates a head which is secured to the casting 3. The numeral 11 indicates a spring, one end of which bears against the member 7 and the other end bears against the member 12, which member 12 is adjustably carried by the screw 13, so that by regulating the screw 13, the pressure on the spring 11 can be varied so as to adjust the liquid pressure in the chamber 2. The numeral 14 indicates a lock nut for locking the screw 13. The numeral 15 is a cap secured to the head 10 and which covers the screw 13. The numeral 16 indicates a by-pass fuel return pipe, which may be connected with a tank, not shown, for the purpose of returning the fuel from the chamber 17. The numeral 18 indicates a hollow pipe secured to the casting 3 and carries at one end a member 19, to which member 19 is secured a spray nozzle 20, of any well known form. The member 19 is provided with a valve seat 21 for the valve 22. The valve 22 is provided with grooves 23 for the passage of oil. The numeral 24 indicates a spring interposed between a head formed on the valve 22 and the member 19, the purpose of which will be later described. The numeral 25 indicates a rod which contacts with the head of the valve 22 and which carries the by-pass valve 26. The numeral 27 indicates a groove cut in the by-pass valve 26, (see Figure 3), the purpose of which will be later described. The rod 25 is guided in the tube 18 at one end by the hexagon member 28, and at the other end by the threaded member 29, (see Figure 3), which member 29 is provided with the holes 30 to permit the passage of fuel into the tube 18.

Where this valve is used in connection with an automatic oil burner, fuel is pumped into the pipe 1 and enters the chamber 2, and then passes through the holes 30 into the interior of the pipe 18. The member 7 will move to the left under pressure of the fuel, and the valve 22 and rod 25 will also move to the left by action of the spring 24, until the shoulder on t'ɔ rod 25 touches the member 29. The movement of the valve 22 and the rod 25, just described, is usually about $\frac{1}{32}$" before it is stopped by the threaded member 29. As soon as the rod 25 is stopped by the member 29, the member 7 will continue to move to the left so that the valve seat 8 will no longer contact with the valve 26 and fuel will be by-passed through the hole 9 and into the pipe 16. The adjustment of the nut 13 will regulate whatever pressure will be maintained in the chamber 2. The groove 27 in the valve 26 permits a very small flow of fuel from the chamber 2. When the valve 22 has moved away from its seat, fuel will flow through the nozzle 20 in a well known manner. When the oil burner is shut off, the pressure of the pump, (not shown), which pump is usually operated by an electric motor, will gradually diminish until the spring 11 will overcome the pressure in the chamber 2 and the member 7 will move to the right, causing the valve seat 8 to contact with the valve 26 and move the rod 25, thereby causing the valve 22 to contact with the seat 21. The spring 11 is much larger and more powerful than the spring 24, so that under the above mentioned conditions, the spring 11 will overcome the pressure of the spring 24. I have found that it is highly desirable to cut the small groove 27 in the by-pass valve so that the valve 22 will close promptly and not permit any after-dribble of oil out of the nozzle 20. If I did not provide the groove 27 in the by-pass valve, then as the member 7 moves to the right and contacts with valve 26 so as to move the rod 25 and valve 22 to the right, the fuel pressure in the chamber 2 will instantly rise and cause the member 7 to again move to the left, and this fluttering action will continue until the pump finally stops and will cause an aftersquirt of oil from the nozzle 20; however, by providing the groove 27, I find that this aftersquirt is eliminated.

My present construction permits the removing of valve 22 by unscrewing the member 19 from the tube 18 without taking the entire valve all apart. I have found that it is sometimes necessary to remove this valve in order to reseat it. I have also found that in the construction shown in my above referred to patent, the weight of the long valve stem is objectionable and causes certain wear on the valve seat, which is overcome with the construction shown in my present invention, as the stem 25 is entirely separate from the valve 22.

I claim:—

1. An automatic valve, comprising a casing for containing a liquid, a yielding member located within the casing adapted to move under action of the liquid pressure, a spring cooperating with the yielding member in opposed relation to the liquid pressure, an elongated tube attached to the casing for conveying the liquid to an outlet located at the end of said tube, a cut-off valve located near the spray nozzle carrying a spring, which spring normally tends to open said cut-off valve, an elongated member within the tube contacting at one end with the cut-off valve and at the other end carrying an automatic by-pass valve which is adapted to seat in a head carried by the yielding member so as to regulate the liquid pressure within the casing and to cooperate with the yielding member to close the cut-off valve at a predetermined pressure, substantially as described.

2. An automatic valve, comprising a casing for containing a liquid, a yielding member located within the casing adapted to move under action of the liquid pressure, a spring cooperating with the yielding member in opposed relation to the liquid pressure, an elongated tube attached to the casing for conveying the liquid to an outlet located at the end of said tube, a cut-off valve located near the spray nozzle carrying a spring, which spring normally tends to open said cut-off valve, an elongated member within the tube contacting at one end with the cut-off valve and at the other end carrying an automatic by-pass valve which is adapted to seat in a head carried by the yielding member so as to regulate the liquid pressure within the casing and to cooperate with the yielding member to close the cut-off valve at a predetermined pressure, a fixed orifice by-pass cooperating with said automatic by-pass.

3. An automatic valve comprising a casing for containing a liquid, a liquid inlet, outlet and by-pass in communication with the casing, a yielding bellows member fixed at one end located within the casing adapted to move under action of liquid pressure, a cut-off valve cooperating with the yielding bellows member adapted to close the outlet at a predetermined pressure within the casing and to open the outlet at a predetermined higher pressure, an automatic by-pass valve cooperating with the yielding bellows member for regulating the liquid pressure in the casing, a fixed orifice by-pass cooperating with the automatic by-pass so as to let a small amount of liquid through the automatic by-pass valve when said valve is closed, a spring cooperating with the yielding bellows member in opposed relation to the liquid pressure for regulating the action of the cut-off and by-pass valves.

4. An automatic valve comprising a casing for containing a liquid, a liquid inlet, outlet and by-pass in communication with the casing, a yielding bellows member fixed at one end located within the casing adapted to move under action of liquid pressure, a cut-off valve cooperating with the yielding bellows member for stopping the flow of liquid from the outlet at a predetermined pressure in the casing, an automatic by-pass valve cooperating with the yielding bellows member, said cut-off and by-pass valves being in contact with a common stem, said yielding bellows member carrying the by-pass valve seat, an adjustable spring cooperating with said yielding bellows member in opposed relation to the liquid pressure for regulating said pressure in the chamber and also the pressure at which the cut-off valve closes for stopping the flow of liquid from the outlet, means independent of the liquid pressure for causing the cut-off valve to move away from its seat when said yielding bellows member is acted on by liquid pressure, means for limiting the movement of said cut-off valve away from its seat so that said yielding bellows member may operate by liquid pressure to permit liquid to be by-passed through said by-pass valve.

5. An automatic valve comprising a casing for containing a liquid, a liquid inlet, outlet and by-pass in communication with the casing, a yielding bellows member fixed at one end located within the casing adapted to move under action of liquid pressure, a cut-off valve cooperating with the yielding bellows member for stopping the flow of liquid from the outlet at a predetermined pressure in the casing, an automatic by-pass valve cooperating with the yielding bellows member, an adjustable spring cooperating with said yielding bellows member in opposed relation to the liquid pressure for regulating said pressure in the chamber and also the pressure at which the cut-off valve closes for stopping the flow of liquid from the outlet, means independent of the liquid pressure for causing the cut-off valve to move away from its seat when said yielding bellows member is acted on by liquid pressure, means for limiting the movement of said cut-off valve away from its seat so that said yielding bellows member may operate by liquid pressure to permit liquid to be by-passed through said by-pass valve.

6. A control valve for oil burners comprising a body having an oil pressure chamber, a port for the admission of fluid under pressure from a supply tank, a port for the burner and a by-pass port for returning excess liquid to the supply tank, a valve in the burner port and a valve in the by-pass port, a single flexible diaphragm adjacent said valves, means for exerting pressure on the side of said diaphragm opposite said valves, and means on said valves for opening said ports when the pressure in the pressure chamber is sufficient to overcome the pressure of the pressure means on the side of said diaphragm opposite said valves.

7. A control valve comprising a valve body having a feed port, a discharge port and a bleed port, a stationary valve seat for establishing communication between the feed port and discharge port, a movable valve seat for establishing communication between the feed port, discharge port and said bleed port and a single valve member cooperating with both valve seats and having a short movement to uncover said stationary valve seat for establishing communication between the feed port and discharge port, said movable valve seat traveling with said valve member its entire distance of travel and means for accommodating further movement of the movable valve seat independently of the valve member whereby said movable valve seat may be uncovered for establishing communication between the bleed port and feed and discharge ports, said means normally tending to hold said movable valve member in position to keep said discharge port closed and actuated by pressure through said feed port to move said valve member to a position to open said discharge port.

8. A control valve comprising a valve body having a feed port, a discharge port and a bleed port, a stationary valve seat for establishing communication between the feed port and discharge port, a movable valve seat for establishing communication between the feed port, discharge port and said bleed port and a single valve member cooperating with both valve seats and having a short movement to uncover said stationary valve seat for establishing communication between the feed port and discharge port, said movable valve seat traveling with said valve member its entire distance of travel and means for accommodating further movement of the movable valve seat independently of the valve member whereby said movable valve seat may be uncovered for establishing communication between the bleed port and feed and discharge ports, said means including a diaphragm solely supporting said movable valve seat and normally tending to hold said valve member in position to keep said discharge port closed and actuated by pressure through said feed port to move said valve member to a position to open said discharge port.

9. A control valve comprising a valve body having a feed port, a discharge port and a bleed port, a stationary valve seat for establishing communication between the feed port and discharge port, a diaphragm dividing the interior of the valve body and arranged in a position between said bleed port and said feed and discharge ports, a valve member having a limited travel for uncovering said stationary port for establishing communication between the feed port and discharge port and a movable valve seat solely supported by the diaphragm in alignment with said stationary valve seat and traveling in closed relation with said valve member but capable of independent movement thereof when the limit of travel of said valve member has been reached thereby uncovering said movable valve seat and establishing communication between the bleed port and said feed and discharge ports, and manually adjustable means for controlling the movement of said diaphragm, said diaphragm normally tending to hold said valve member in position to keep said discharge port closed and actuated by pressure through said feed port to move said valve member to a position to open said discharge port.

10. In combination, a valve body, a valve device mounted within the valve body and a pressure regulator coacting with said valve device, said valve body having a feed port, a discharge port and a bleed port, said valve device including a needle valve for establishing communication between the feed port and the discharge port and further including a valve seat movable with the needle valve and capable of independent movement thereof under predetermined conditions for establishing communication between said bleed port and said feed and discharge ports, said pressure regulator including a bellows type diaphragm tending to hold said needle valve in position to keep said discharge port closed and actuated by pressure through said feed port to move said needle valve to a position to open said discharge port and a manually adjusted pressure spring directly engaging said valve seat.

11. An oil feeding valve comprising, a valve body, having an oil feed port, an oil delivery port and an oil bleed port, a plug having screw threaded engagement with the wall of said oil discharge port and provided with an inlet and an outlet for establishing communication between said oil feed port and said oil delivery port, a needle valve having a limited sliding connection to said plug for establishing and interrupting communication between said inlet and said outlet, a coil spring for giving a limited movement to said needle valve, a valve seat slidably mounted on an end of said needle valve and a pressure regulator including a bellows type diaphragm normally tending to hold said needle valve in position to interrupt communication between said inlet and said outlet and actuated by pressure through said feed port to move said needle valve to a position to establish communication between said inlet and said outlet.

12. In a device of the character described, in combination, a valve body having a stationary discharge port, a bellows type diaphragm, a bleed valve seat secured to and forming one end of the diaphragm for establishing communication between the interior of the diaphragm and the exterior of the diaphragm, a needle valve for covering and uncovering said discharge port and having a limited relative sliding movement with said bleed valve seat, said diaphragm normally tending to hold said needle valve in position to keep discharge port closed and actuated by pressure through said feed port to move said needle valve to a position to open said discharge port.

13. A control valve comprising a hollow valve body having an inlet port and a plurality of discharge ports, a ported valve seat member for establishing communication between said inlet port and one of said discharge ports, a second ported valve seat member for establishing communication between said inlet port and another of said discharge ports, means responsive to pressure of fluid entering said inlet port, a valve member cooperable with each of said seat members and movable in unison, said responsive means controlling movement of said valve members, and means to limit movement of one valve member relative to its seat member, the other of said valve members and its seat member having movement relative to each other upon operation of said limiting means so that first one of said discharge ports will be opened and then upon an increase of fluid pressure in said inlet port the other of said discharge ports will be opened.

14. A control valve for oil burners comprising a body having an oil pressure chamber, a port for the admission of fluid under pressure from a supply tank, a port for the burner and a by-pass port for returning excess liquid to the supply tank, a valve controlling the burner port and a valve controlling the by-pass port, a flexible diaphragm member adjacent said valves, means for exerting pressure on the side of said diaphragm member opposite said valves, and means on said valves for opening said ports when the pressure in the pressure chamber is sufficient to overcome the pressure of the pressure means on the side of said diaphragm member opposite said valves.

15. An automatic valve comprising a hollow casing having an inlet port and a plurality of outlet ports, a yielding bellows member fixed at one end and located within said casing, a valve member cooperable with said bellows member and operable to open one of said outlet ports at a predetermined fluid pressure in said casing, a second valve member cooperable with said bellows member and operable to open the other of said outlet ports at a predetermined higher fluid pressure in said casing to determine the maximum fluid pressure in said casing and on said one outlet port, a by-pass passageway for said other outlet port so that a small amount of fluid can pass from said casing when said second valve member is closed, and a spring cooperating with said bellows member in opposed relation to the pressure in said casing to regulate the operation of said valve members.

LEWIS L. SCOTT.

CERTIFICATE OF CORRECTION.

Patent No. 2,071,143.  February 16, 1937.

LEWIS L. SCOTT.

It is hereby certified that error appears in the printed specification of the above numbered patent requiring correction as follows: Page 2, first column, lines 25 and 44; claims 1 and 2 respectively, for the words "spray nozzle" read outlet; and that the said Letters Patent should be read with these corrections therein that the same may conform to the record of the case in the Patent Office.

Signed and sealed this 27th day of April, A. D. 1937.

(Seal)

Leslie Frazer
Acting Commissioner of Patents.

15. An automatic valve comprising a hollow casing having an inlet port and a plurality of outlet ports, a yielding bellows member fixed at one end and located within said casing, a valve member cooperable with said bellows member and operable to open one of said outlet ports at a predetermined fluid pressure in said casing, a second valve member cooperable with said bellows member and operable to open the other of said outlet ports at a predetermined higher fluid pressure in said casing to determine the maximum fluid pressure in said casing and on said one outlet port, a by-pass passageway for said other outlet port so that a small amount of fluid can pass from said casing when said second valve member is closed, and a spring cooperating with said bellows member in opposed relation to the pressure in said casing to regulate the operation of said valve members.

LEWIS L. SCOTT.

CERTIFICATE OF CORRECTION.

Patent No. 2,071,143.  February 16, 1937.

LEWIS L. SCOTT.

It is hereby certified that error appears in the printed specification of the above numbered patent requiring correction as follows: Page 2, first column, lines 25 and 44; claims 1 and 2 respectively, for the words "spray nozzle" read outlet; and that the said Letters Patent should be read with these corrections therein that the same may conform to the record of the case in the Patent Office.

Signed and sealed this 27th day of April, A. D. 1937.

(Seal)

Leslie Frazer
Acting Commissioner of Patents.

CERTIFICATE OF CORRECTION.

Patent No. 2,071,143. February 16, 1937.

LEWIS L. SCOTT.

It is hereby certified that error appears in the printed specification of the above numbered patent requiring correction as follows: Page 2, first column, lines 25 and 44; claims 1 and 2 respectively, for the words "spray nozzle" read outlet; and that the said Letters Patent should be read with these corrections therein that the same may conform to the record of the case in the Patent Office.

Signed and sealed this 27th day of April, A. D. 1937.

(Seal)

Leslie Frazer
Acting Commissioner of Patents.